(12) United States Patent
Kao

(10) Patent No.: US 6,523,060 B1
(45) Date of Patent: *Feb. 18, 2003

(54) METHOD AND APPARATUS FOR THE MANAGEMENT OF QUEUE POINTERS BY MULTIPLE PROCESSORS IN A DIGITAL COMMUNICATIONS NETWORK

(75) Inventor: Ruey Kao, Cupertino, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/418,797

(22) Filed: Apr. 7, 1995

(51) Int. Cl.[7] ............................................. G06F 15/15
(52) U.S. Cl. .................. 709/202; 709/201; 709/214; 709/215; 710/52; 710/54; 711/5; 711/100; 370/413
(58) Field of Search ................................ 711/3, 5, 100, 711/132, 170; 709/201–202, 213–215; 712/32, 225; 370/394–395, 413, 418

(56) References Cited

U.S. PATENT DOCUMENTS

| | | | | |
|---|---|---|---|---|
| 4,543,626 A | * | 9/1985 | Bean et al. ................... | 709/201 |
| 4,894,797 A | * | 1/1990 | Wolp ........................... | 711/109 |
| 5,278,828 A | * | 1/1994 | Chao ............................ | 370/394 |
| 5,317,692 A | * | 5/1994 | Ashton et al. ................. | 711/5 |
| 5,493,652 A | * | 2/1996 | Koufopavlou et al. ...... | 711/170 |
| 5,502,833 A | * | 3/1996 | Byrn et al. ................... | 711/132 |
| 5,526,344 A | * | 6/1996 | Diaz et al. ................... | 370/364 |
| 5,557,607 A | * | 9/1996 | Holden ........................ | 370/413 |

* cited by examiner

Primary Examiner—Meng-Al T. An
Assistant Examiner—Bharat Barot
(74) Attorney, Agent, or Firm—Blakely, Sokoloff, Taylor & Zafman LLP

(57) ABSTRACT

A method for managing a buffer queue that stores a data queue, wherein the data queue comprises a set of n data elements, n being at least zero. A head pointer is stored at a first location, which may be in a cache controlled by a first processor. The head pointer indicates a head buffer of the buffer queue. The first processor reads the head pointer to determine the head buffer of the buffer queue when a data element is to be removed from the data queue. The first processor reads a next pointer of the head buffer to determine whether the data queue is empty. The first processor determines that the data queue is empty when the next pointer has a first value, which indicates that the head buffer is a dummy buffer.

21 Claims, 14 Drawing Sheets

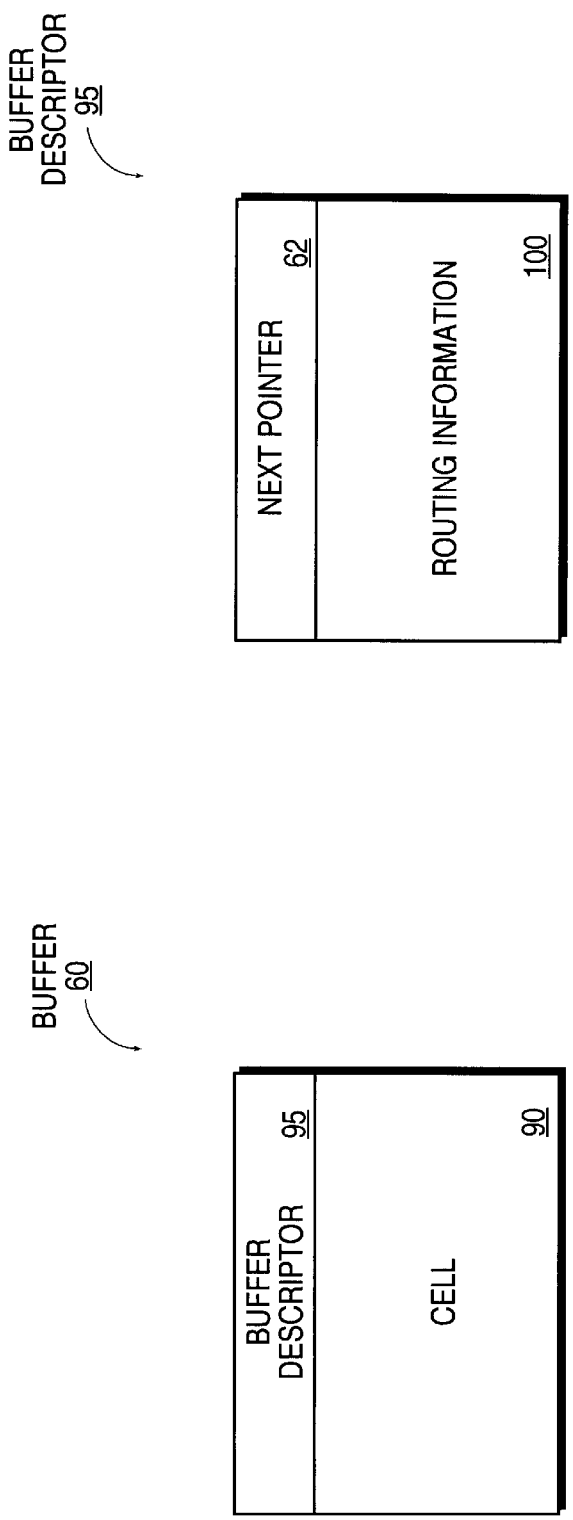

METHOD AND APPARATUS FOR THE MANAGEMENT OF QUEUE POINTERS BY MULTIPLE PROCESSORS IN A DIGITAL COMMUNICATIONS NETWORK

FIELD OF THE INVENTION

The present invention relates generally to data storage management and more particularly to the management by multiple processors of queue pointers that indicate the beginning and end of a queue.

BACKGROUND OF THE INVENTION

Cell switching is a method of transmitting information wherein a relatively large unit of information called a "frame" is broken into smaller, equal sized units of information called "cells." A frame is typically segmented into cells by the Segmentation And Reassembly (SAR) unit of a source node from which the frame originates. The source node serially transmits each cell of a frame to a destination node through a digital communication network constructed of communication lines, switches, and intermediate nodes that forward the cells to the destination node. An SAR unit of the destination node reassembles the frame using the transmitted cells after all cells of a frame have been received.

Digital communication networks have a limited amount of bandwidth such that only a certain amount of information can be transmitted across the network per unit time. One consequence of limited bandwidth is contention for network resources, and one solution for such contention is to store cells until network resources become free, at which time the stored cells may be transmitted to their destinations. To ensure that frames are correctly reconstructed by the destination node, stored cells must be queued such that they are transmitted in the order that they were segmented (or received).

According to one mechanism for storing cells, one or more memory devices are provided as a "buffer pool" comprising a multiplicity of "buffers." Each buffer is of a fixed size, and each buffer stores a single cell. A buffer may also store associated control information required for queuing and routing the stored cell. Wherein each buffer is associated with a memory location, ordering is not implied by the memory address of a buffer. Instead, buffers are queued by creating and maintaining linked lists of buffers.

The control information for each buffer includes a "next pointer" that allows the creation of a linked list of buffers as cells are stored. For example, when a first cell is stored in a first buffer to begin the queue, the next pointer of the first buffer is set to a null value, indicating that the first buffer is the last buffer of the queue. When a second, sequentially received (or segmented) cell is stored in a second buffer, the next pointer of the first buffer is modified to indicate or "point" to the memory location of the second buffer, and the next pointer of the second buffer is set to a null value to indicate that the second buffer is the end of the queue. Next pointers may be stored by the buffers or in a separate next pointer array.

Wherein the next pointers of the buffers provide the general order of the queue, a "head pointer" specifies the "head" or beginning of the queue, and a "tail pointer" specifies the "tail" or the end of the queue. When a new buffer is added to a queue, the tail pointer of the queue is set to indicate the new buffer as the tail of the queue. Similarly, when a buffer is removed from the queue, the head pointer is set to the buffer pointed to by the next pointer of the removed buffer.

Because buffers are often simultaneously added to and removed from the queue, a first processor is typically responsible for adding buffers to the queue, and a second processor is typically responsible for removing buffers from the queue. The first processor may be called the "queuing processor," and the second processor may be called the "servicing processor."

According to a traditional approach of the prior art, whenever a buffer is to be removed from a queue, the servicing processor first determines whether the queue is empty. The servicing processor may determine that a queue is empty by checking the value of an empty queue flag or by checking the head pointer to see if it has a zero value. If the queue is not empty, the servicing processor reads both the head pointer and the tail pointer to determine if the head pointer and the tail pointer both point to the same buffer, which indicates that the buffer is the last buffer of the queue. The servicing processor transmits the data of the last buffer and sets both the head pointer and the tail pointer to a null or invalid value. Setting the head and tail pointers to a null value frees the last buffer of the queue to be used by other queues.

When the queuing processor is to add a buffer to the queue, the queuing processor checks to see if both the head pointer and the tail pointer have a null value, which indicates that the queuing processor is adding a buffer to an empty queue. If the queuing processor is adding a buffer to an empty queue, the queuing processor sets both the head and tail pointers to indicate the buffer that has been added to the queue. Thus, the queuing processor must read both the head and tail pointers to determine when it is adding a data element to an empty queue, and the servicing processor must read both the head and tail pointers to determine when it is emptying the queue. The head and tail pointers are therefore used to determine when a queue enters or leaves an empty state.

Because both processors require access to the head and tail pointers, the head and tail pointers are stored in shared memory. When the servicing processor determines that it is removing the last buffer of the queue, the servicing processor performs an atomic memory access to set the head and tail pointers to a null value so that the queuing processor can determine when the queue is empty. An atomic memory access by one processor entails a read-modify-write operation wherein the other processor is not allowed to access shared memory until the read-modify-write operation has completed. Similarly, the queuing processor performs an atomic memory access to set the head and tail pointers of an empty queue to the value of the memory location of the buffer being added to the empty queue.

An atomic memory access by either of the producer and servicing processors prevents the other processor from accessing the head and tail pointers. Therefore, when buffers are to be rapidly added to and removed from the queue, the use of shared memory to store the head and tail pointers is undesirable because a processor must be stalled to allow an atomic access of the shared memory to complete.

Although cache memories may be used to locally store data that is also stored in shared memory, there would be problems with storing head and tail pointers in cache memories when both processors must read both the head and tail pointers prior to manipulating the queue. This is because the queuing processor independently updates the tail pointer, and the servicing processor independently updates the head pointer. For high-speed systems, the head and tail pointers are rapidly and independently updated, which would result in frequent cache misses due to stale data and excessive overhead to maintain cache coherency by flushing and refilling. If the cache coherence operations did not result in a system failure, the use of caches to store head and tail pointers would be inefficient compared to merely using shared memory.

SUMMARY AND OBJECTS OF THE INVENTION

It is therefore an object of the present invention to decouple the head pointer from the tail pointer such that the queuing processor is only required to read the tail pointer and the servicing processor is only required to read the head pointer.

It is a further object of the present invention to provide a method for managing head and tail pointers wherein the head and tail pointers may be efficiently stored in cache memories or internal registers.

These and other objects of the invention are provided by a method for managing a buffer queue that stores a data queue, wherein the data queue comprises a set of n data elements, n being at least zero. A head pointer is stored at a first location, which may be in a cache controlled by a first processor. The head pointer indicates a head buffer of the buffer queue. The first processor reads the head pointer to determine the head buffer of the buffer queue when a data element is to be removed from the data queue. The first processor reads a next pointer of the head buffer to determine whether the data queue is empty. The first processor determines that the data queue is empty when the next pointer has a first value, which indicates that the head buffer is a dummy buffer.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 4 shows an exemplary buffer format.

FIG. 5 shows a buffer descriptor of an exemplary buffer.

DETAILED DESCRIPTION

A number of terms are used consistently herein. A "data queue" is a queue of data elements, such as the cells of a cell switching network, and "data queue length" refers to the length of a data queue. An "empty data queue" is a data queue containing no data elements. A "buffer queue" is a queue of buffers used to store a data queue. Typically, each buffer stores at least one data element, and a buffer that stores a data element is called a "data buffer." A "dummy buffer" is a buffer that stores invalid data and is provided such that a buffer queue that stores an empty data queue comprises at least one buffer. Thus, a buffer queue cannot be empty, and the head and tail pointers of a buffer queue are made independent of one another. The prior method for queue management described above does not distinguish between data queues and buffer queues because the number of buffers is always equal to the number data elements, and an empty data queue results in an empty buffer queue, requiring the setting of the head and tail pointers to a null value.

One or more dummy buffers are provided for each buffer queue such that the buffer queue cannot become empty, even when the buffer queue currently stores no data elements. Because the head and tail pointers always point to a buffer, there is no need to perform an atomic memory access when a data queue becomes empty or when a data element is added to a data queue. Therefore, neither processor is required to read both the head and tail pointers, and the tail and head pointers therefore need not be stored in a shared memory location. Instead, the tail pointer may be stored in a first cache associated with and controlled by the queuing processor, and the head pointer may be stored in a cache associated with and controlled by the servicing processor. Wherein the use of a dummy buffer in a buffer queue effectively requires that at least one buffer of the buffer pool is always in use, the ability to cache the head and tail pointers counterbalances the inability to recycle all buffers of the buffer pool and yields a substantial advantage over prior methods.

Figure 1:
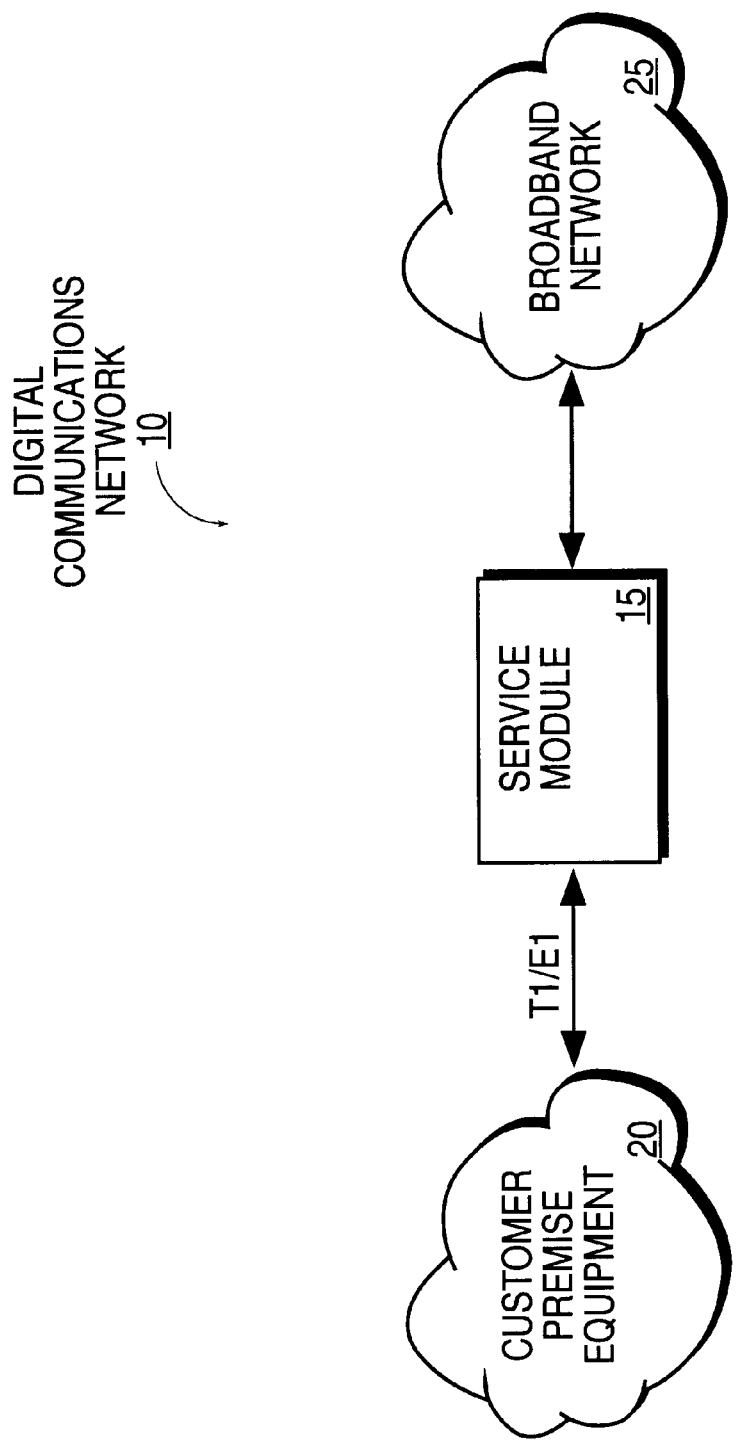
FIG. 1 shows a digital communications network.

FIG. 1 shows a digital communications network 10. Digital communications network 10 includes a service module 15 that acts as a bridge or gateway between customer premise equipment (CPE) 20 and broadband network 25. CPE 20 may comprise any type of network and associated network equipment. For example, CPE 20 may be a frame relay system or an asynchronous transfer mode ("ATM") network. CPE 20 equipment may therefore be connected to service module 15 by one or more T1 or E1 communication lines. Broadband network 25 is typically a large telecommunications network that connects the CPE 20 to remote sites. Broadband network 25 may be any type of broadband network, such as a network using equipment sold by Stratacom®, Inc., of San Jose, Calif.

Service module 15 operates according to a servicing algorithm for regulating traffic between CPE 20 and broadband network 25. Typically, CPE 20 has a "service contract" that limits the amount of bandwidth of broadband network 25 that CPE 20 may use to send data to remote sites. Service module 15 therefore monitors the amount of "ingress" traffic directed to broadband network 25 to better ensure that the limits defined by the service contract are not exceeded. Service module 15 also monitors "egress" traffic directed from broadband network 25.

The methods described herein may find practical operation in any setting wherein multiple processors manage a queue of buffers for storing data elements; however, digital communications network 10 shown in FIG. 1 provides an excellent example for the application of the presently described methods. As service module 15 is responsible for regulating traffic flow between CPE 20 and broadband network 25, service module 15 is responsible for queuing the cells that are transmitted between CPE 20 and broadband network 25 to better ensure that cells are not lost. The methods described herein may also be applied in systems wherein a single processor performs the functions of both the servicing processor and the queuing processor for the same queue of buffers; however, the methods provide greater advantages and are more efficient in multiprocessor systems.

Figure 2:
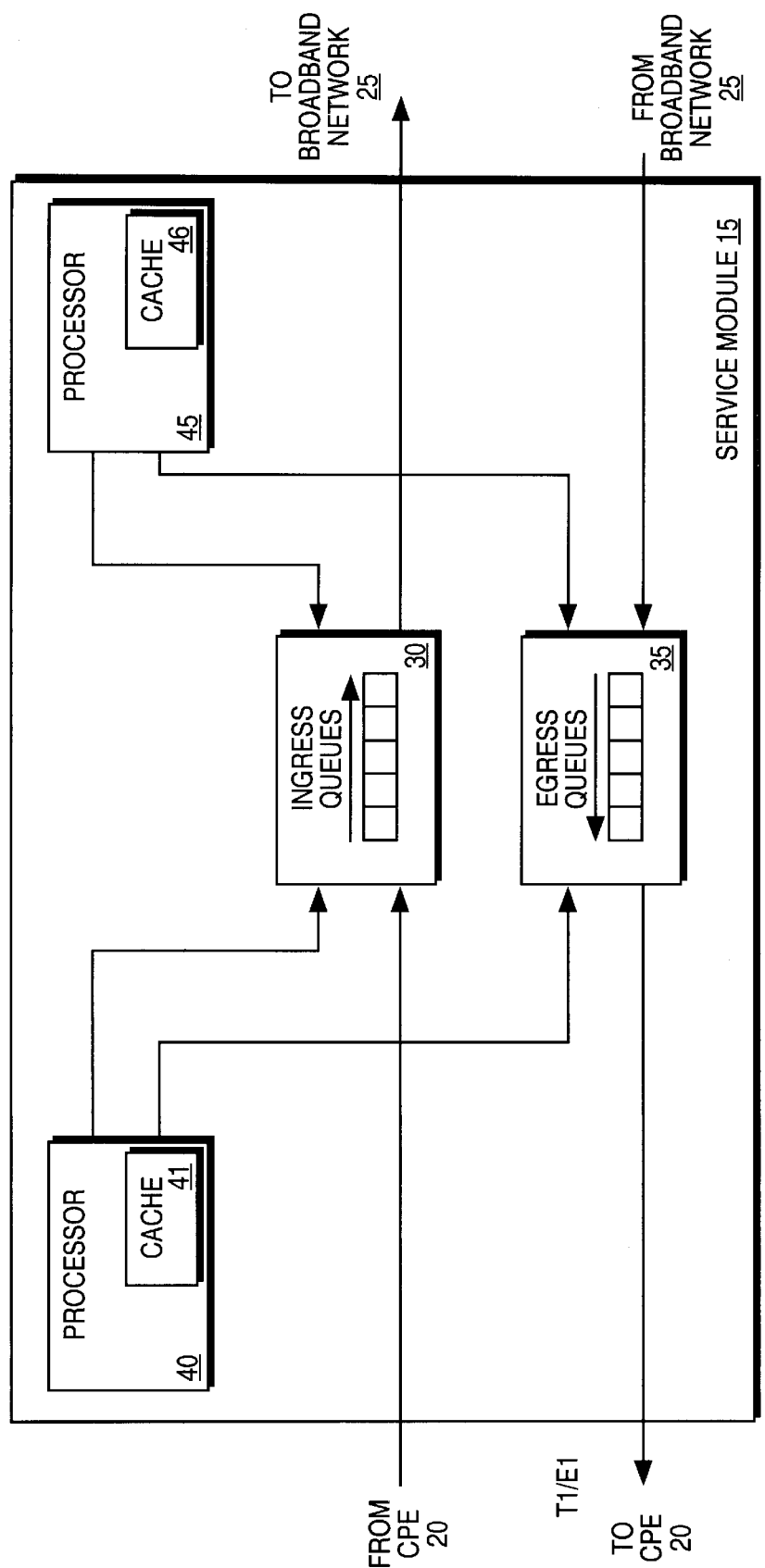
FIG. 2 shows a service module of the digital communications network.

FIG. 2 shows service module 15 in greater detail. As shown, service module 15 includes separate ingress buffer queues 30 and egress buffer queues 35. Due to the nature of networks, there are typically multiple ingress buffer queues and multiple egress buffer queues, one for each logical port or "virtual connection" of CPE 20 and broadband network 25 that routes its traffic through service module 15. For example, a single T1 trunk provides a maximum of twenty-four virtual connections at a transfer rate of 64 kbps each.

Service module 15 is shown as including a processor 40 having a cache 41 and a processor 45 having a cache 46. Processor 40 is responsible for queuing ingress data. If CPE 20 comprises a network that does not use cell switching, such as a frame relay network, processor 40 may perform protocol translation and segmentation to reduce incoming frame relay packets to cells for transfer via broadband network 25. Alternatively, processor 40 may simply queue the incoming frames wherein processor 45 transmits the data of a queued frame on a cell-by-cell basis. If CPE 20 comprises a cell-switching network such as an ATM network, processor 40 need merely add the cells to the ingress buffer queues. Processor 40 is also responsible for removing incoming cells from the egress buffer queues. Thus, processor 40 acts as the queuing processor for ingress buffer queue 30 and the servicing processor for egress buffer queue 35.

Processor 45 is responsible for implementing the servicing algorithm of service module 15, for removing outgoing cells from the ingress buffer queues, and for queuing incoming cells in the egress buffer queues. Processor 45 is therefore the servicing processor for ingress buffer queue 30 and the queuing processor for egress buffer queue 35.

Both processor 40 and processor 45 are shown as being coupled to ingress buffer queue 30 and egress buffer queue 35, and the manner of the connection shown in FIG. 2 implies the roles of processor 40 and processor 45 in the queue management of the ingress and egress buffer queues. For example, processor 40 maintains tail pointers for ingress buffer queues 30 and head pointers for egress buffer queues 35, and processor 45 maintains head pointers for ingress buffer queues 30 and tail pointers for egress buffer queues 35. The tail pointers for ingress buffer queues 30 and the head pointers for egress buffer queues 35 are stored in cache 41 of processor 40. Similarly, the head pointers of ingress buffer queues 30 and the tail pointers of egress buffer queues 35 are stored in cache 46 of processor 45.

Wherein caches 41 and 46 are shown as being internal to the respective processors, caches 41 and 46 may be external to the processors. Furthermore, the head and tail pointers may alternatively be stored by internal registers of the queuing and servicing processors, or by external registers. Because the head and tail pointers are independent from one another, many of the advantages of the presently described methods may be achieved by storing the head and tail pointers in non-shared memory locations such that atomic memory accesses are not required.

Figure 3:
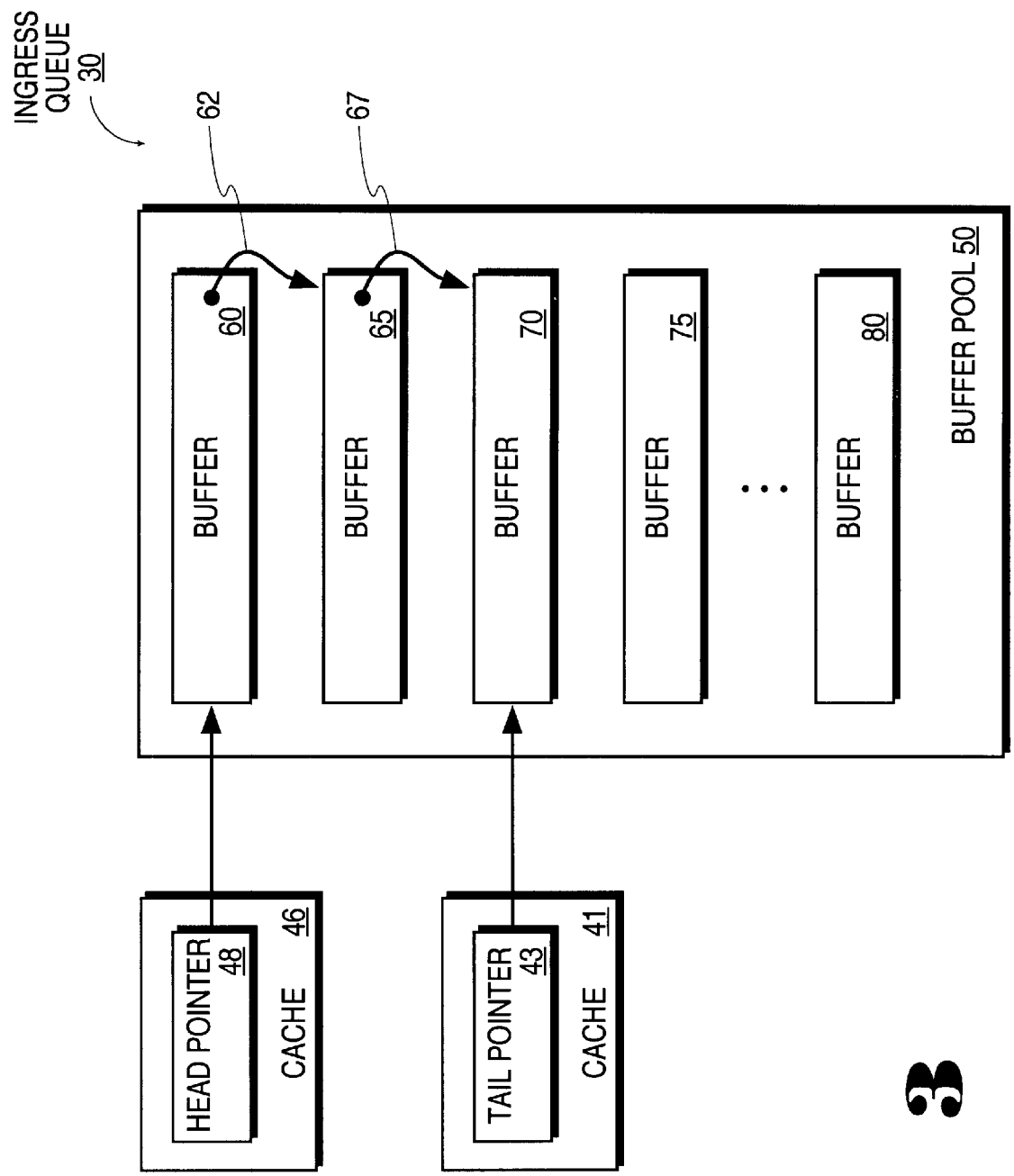
FIG. 3 shows a buffer queue.

FIG. 3 shows an ingress buffer queue 30 in more detail. Ingress buffer queue 30 is shown as being stored by a buffer pool 50. Buffer pool 50 comprises a plurality of memory locations or "buffers" of fixed size, each for storing a data element such as a cell. Buffer pool 50 may be implemented as one or more memory devices such as DRAMs.

No ordering is required or implied by the memory addresses of the buffers. Instead, the buffers in a queue are linked to one another as a linked list using next pointers such as next pointers 62 and 67. For the example shown in FIG. 3, a queue of three buffers is shown. Buffer 60 is indicated as the head buffer of the queue by the head pointer 48 stored in cache 46. Buffer 70 is shown as the tail buffer as indicated by the tail pointer 43 stored in cache 41.

The next pointer 62 of buffer 60 indicates that buffer 65 is the next buffer in the queue, and next pointer 67 indicates that buffer 70 is the next buffer after buffer 65. Wherein the next pointers are shown graphically as arrows linking one buffer to the next buffer, according to one embodiment, each next pointer comprises the address of the next buffer in the buffer queue. The information of the next pointers may be stored by the buffers or by a separate array of memory locations. According to the present embodiments, each next pointer is stored as a part of a buffer. FIG. 4 shows an exemplary buffer format. Buffer 60 is shown as storing a cell 90 and a buffer descriptor 95. FIG. 5 shows that the buffer descriptor includes the next pointer 62 that points to buffer 65 and routing information 100.

Each of the ingress and egress buffer queues includes one or more "dummy" buffers such that each buffer queue always includes at least one buffer, even when the data queue stored by the buffer queue is empty. A dummy buffer is an "empty" buffer that stores invalid data. A dummy buffer may be provided in one of at least two ways: 1) a buffer that has transmitted its contents is not recycled and remains as the head buffer; and 2) a designated dummy buffer is provided wherein the dummy buffer is always the last buffer of the buffer queue.

Figure 6:
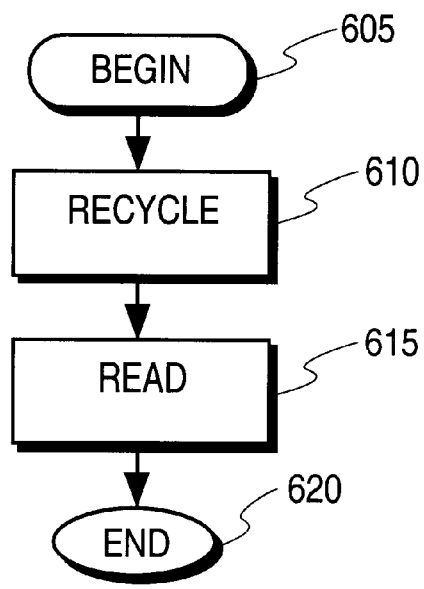
FIG. 6 shows a general "recycle-then-read" buffer management method.

FIG. 6 is a flow chart of a general method for managing a buffer queue when removing a data element from the stored data queue. The method of FIG. 6 is a "recycle-then-read" process that presumes that the head buffer is "empty" (a dummy buffer) when the servicing processor is enabled to transmit a data element of the data queue. The process begins at block 605 when the servicing processor is enabled to transmit the next data element of the data queue. At process block 610, the current head buffer pointed to by the head pointer is recycled by setting the head pointer to point to the buffer indicated by the next pointer associated with the current head buffer. Thus, a new head buffer is indicated by the head pointer. At process block 615, the contents of the new head buffer are read, and the process ends at process block 620. The new head buffer is "empty," and the head pointer continues to point to the new head buffer until the next data element is to be removed from the buffer queue. Therefore, the head pointer always points to a dummy buffer when the buffer read transaction is initiated, and a buffer queue that is managed according to the method shown by FIG. 6 includes n+1 buffers for storing data queue comprising a set of n data elements, wherein n is equal to zero or more.

Figure 7:
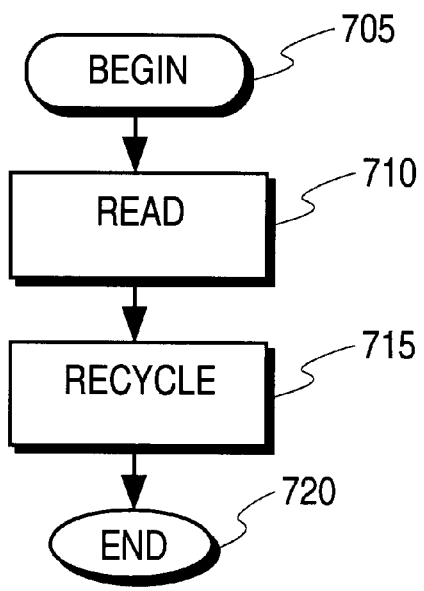
FIG. 7 shows a general "read-then-recycle" buffer management method.

FIG. 7 is a flow chart showing an alternative method for managing a buffer queue when removing a data element from the stored data queue. The difference between the methods shown in FIG. 6 and FIG. 7 is the state of the buffer queue when a data element is to be removed from the data queue. The method of FIG. 7 is a "read-then-recycle" process results in the buffer queue storing a dummy buffer when the data queue becomes empty. The process begins at process block 705 when the servicing processor is enabled to transmit a data element stored by a buffer of the buffer queue. At process block 705, the data element stored by the current head buffer is read, and the current head buffer is recycled at process block 715. The process ends at process block 720.

According to the method shown in FIG. 7, the head pointer points to a dummy buffer when the data queue stored by the buffer queue is empty. The head pointer continues to point to a dummy buffer as data elements are added to the data queue (and buffers are added to the buffer queue) until the servicing processor is enabled to read data elements from the stored data queue. Thus, a buffer queue that is managed according to the method of FIG. 7 may use either n buffers or n+1 buffers, depending on whether the buffer queue was recently emptied of data elements.

One mechanism for detecting that the head buffer is a dummy buffer is to maintain a count of the number of data elements in the data queue such that the servicing processor is not allowed to read a dummy buffer queue. This helps to prevent the contents of the dummy buffer from being inadvertently transmitted as valid data by the servicing processor. For example, the servicing processor may maintain a value representative of the data queue length. If the data queue length is zero, the servicing processor will not allow the buffer queue that stores the empty data queue to be read.

An alternative mechanism for detecting that the head buffer is a dummy buffer requires that the servicing processor sets an empty flag upon detecting that the next pointer of the buffer to be recycled has an invalid or null value, which indicates that the current head buffer is the last buffer of the queue. While the empty flag is set, the head buffer is a dummy buffer, and the servicing processor skips process block 710 and immediately reads the next pointer of the dummy buffer at process block 715. When the queuing processor adds a data element to an empty data queue, the queuing processor writes the address of the new buffer to the next pointer of the dummy buffer. If the servicing processor detects that the next pointer of the dummy buffer points to another buffer, the servicing processor clears the empty flag, resets the head pointer to point to the new buffer, and performs the steps of process blocks 710 and 715.

Thus far, the described mechanisms for detecting an empty data queue assume that dummy buffers are merely empty head buffers that have not been recycled. Another alternative is to specify a buffer as a dummy buffer such that the servicing processor may detect that the head buffer is the dummy buffer by merely comparing the value of the head pointer to the addresses of known dummy buffers. Upon determining that the head buffer is a dummy buffer, the servicing processor monitors the next pointer of the dummy buffer as described above. Thus, the head pointer itself acts as a form of empty flag.

Figure 8:
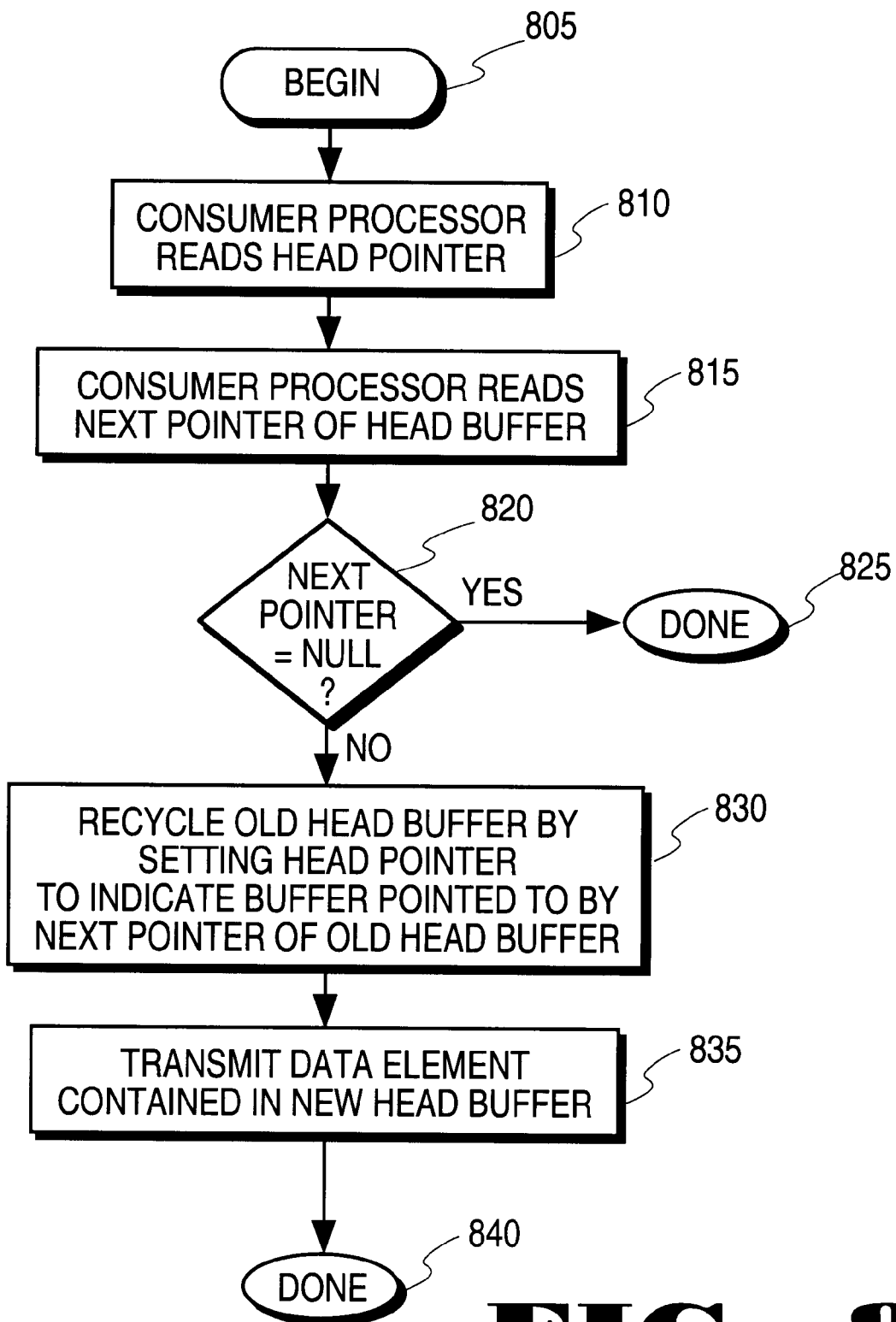
FIG. 8 shows a buffer management method according to one embodiment.

FIG. 8 is a flow chart showing a more detailed "recycle-then-read" queue management process such as that described with respect to FIG. 6. The process begins at process block 805 when the servicing processor is enabled to remove a data element from the data queue. At process block 810, the servicing processor reads the head pointer, which may be stored in a cache associated with the servicing processor. At process block 815, the servicing processor reads the next pointer of the head buffer indicated by the head pointer. At process block 820, it is determined whether the value of the next pointer is invalid or null, indicating that no data elements remain in the data queue and that the head buffer is a dummy buffer. If the next pointer has a null value, the process ends at process block 825 because the data queue is empty. The queuing processor updates the next pointer of the dummy buffer to point to the buffer that stores the new data element because the dummy buffer is the tail buffer of the buffer queue. Thus, the servicing processor detects that a previously empty data queue is no longer empty when the next pointer of the dummy buffer points to another buffer, and the dummy buffer can be recycled. Process blocks 820 and 825 may be omitted if a separate mechanism is provided that prevents the enabling of the servicing processor when the data queue is empty. For example, the service module may maintain a value indicative of the data queue length. If the value of the data queue length is zero, the data queue is empty, and the queue will not be serviced.

If the next pointer of the head buffer points to another buffer, the servicing processor sets the head pointer to point to that buffer at process block 830. Thus, there is a new head buffer. The "old" head buffer is recycled, and the servicing processor reads the data element contained in the new head buffer at process block 835. The process ends at process block 840. The steps of process blocks 805–840 are repeated for each data element to be removed from the data queue.

Figure 9A:
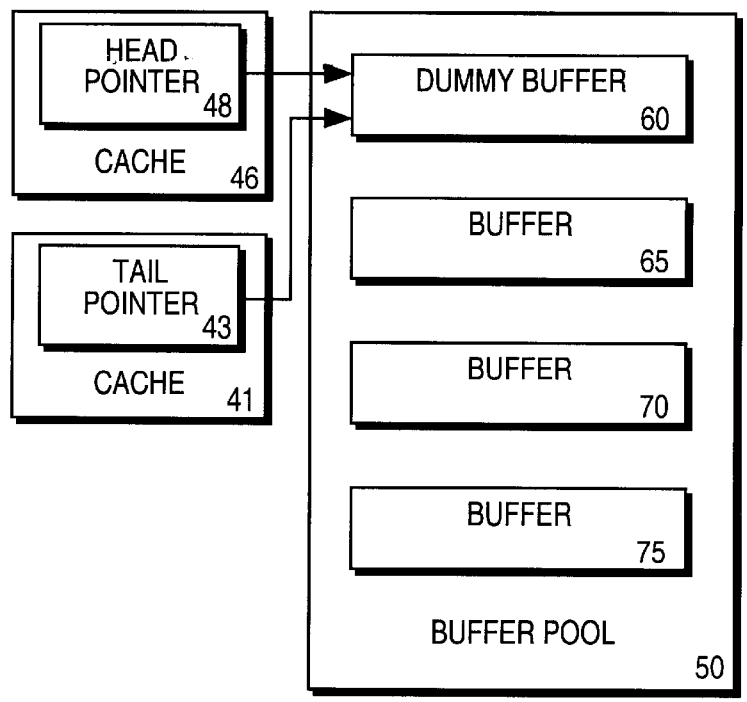
FIGS. 9A, 9B, 9C, 9D, 9E, 9F, and 9G illustrate the operation of the method shown in FIG. 8.
Figure 9B:
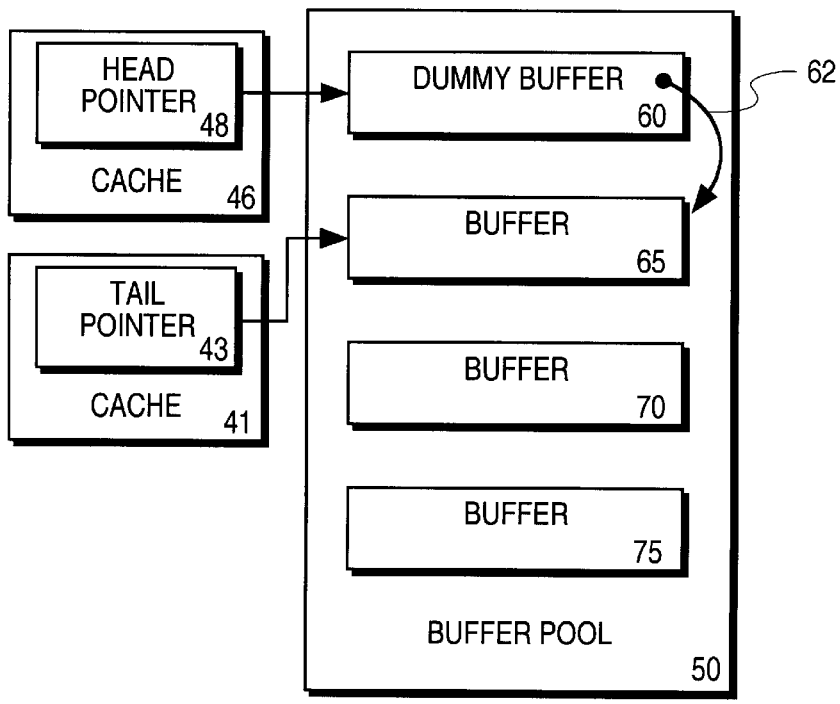
Figure 9C:
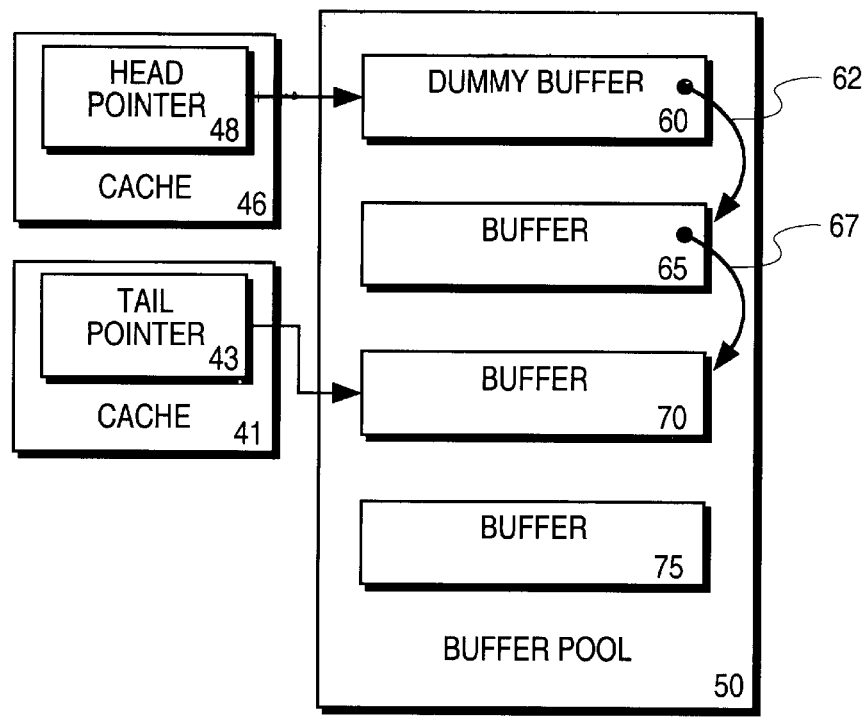

FIGS. 9A–9G illustrate the process shown in FIG. 8. FIG. 9A shows an empty data queue wherein both the head pointer and the tail pointer point to a dummy buffer, which is shown as being buffer 60. FIG. 9B shows a first buffer being added to the buffer queue, indicating that the data queue now contains one data element. As shown, the queuing processor updates the next pointer 62 of dummy buffer 60 to point to buffer 65. The queuing processor also updates the tail pointer to indicate buffer 65 as the tail buffer. The tail pointer may be stored in a cache associated with the queuing processor. The next pointer of the tail buffer by default contains a null or invalid value that indicates that no further buffers remain in the buffer queue. The head pointer continues to point to the head buffer, indicating that the servicing processor has not yet been enabled to remove a data element from the data queue. FIG. 9C shows buffer 70 as being added to the buffer queue. The next pointer 67 of buffer 65 is updated to indicate buffer 70 as the next buffer in the buffer queue, and the tail pointer indicates buffer 70 as the tail buffer.

Figure 9D:
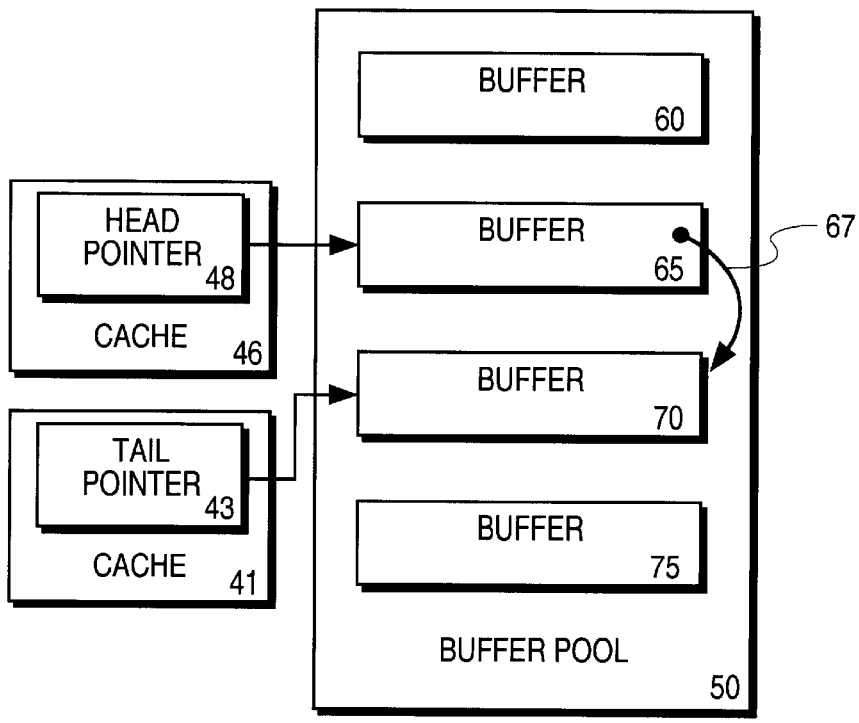
Figure 9E:
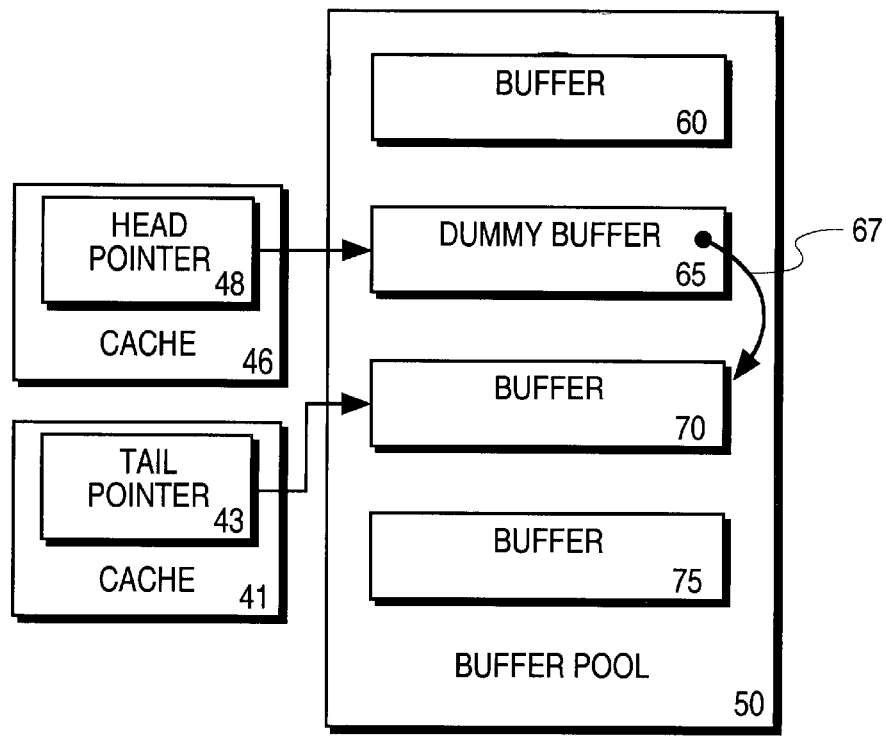
Figure 9F:
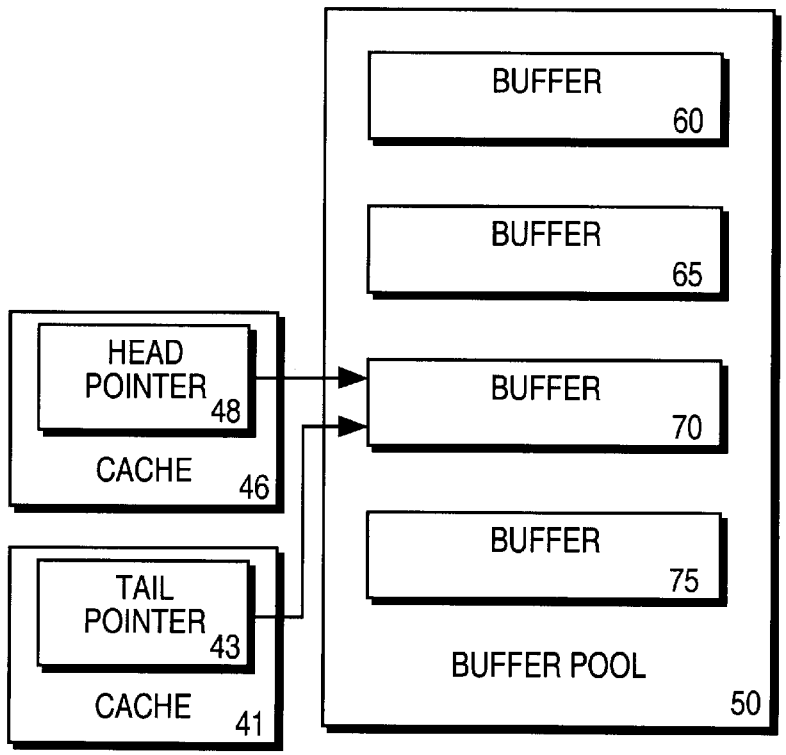
Figure 9G:
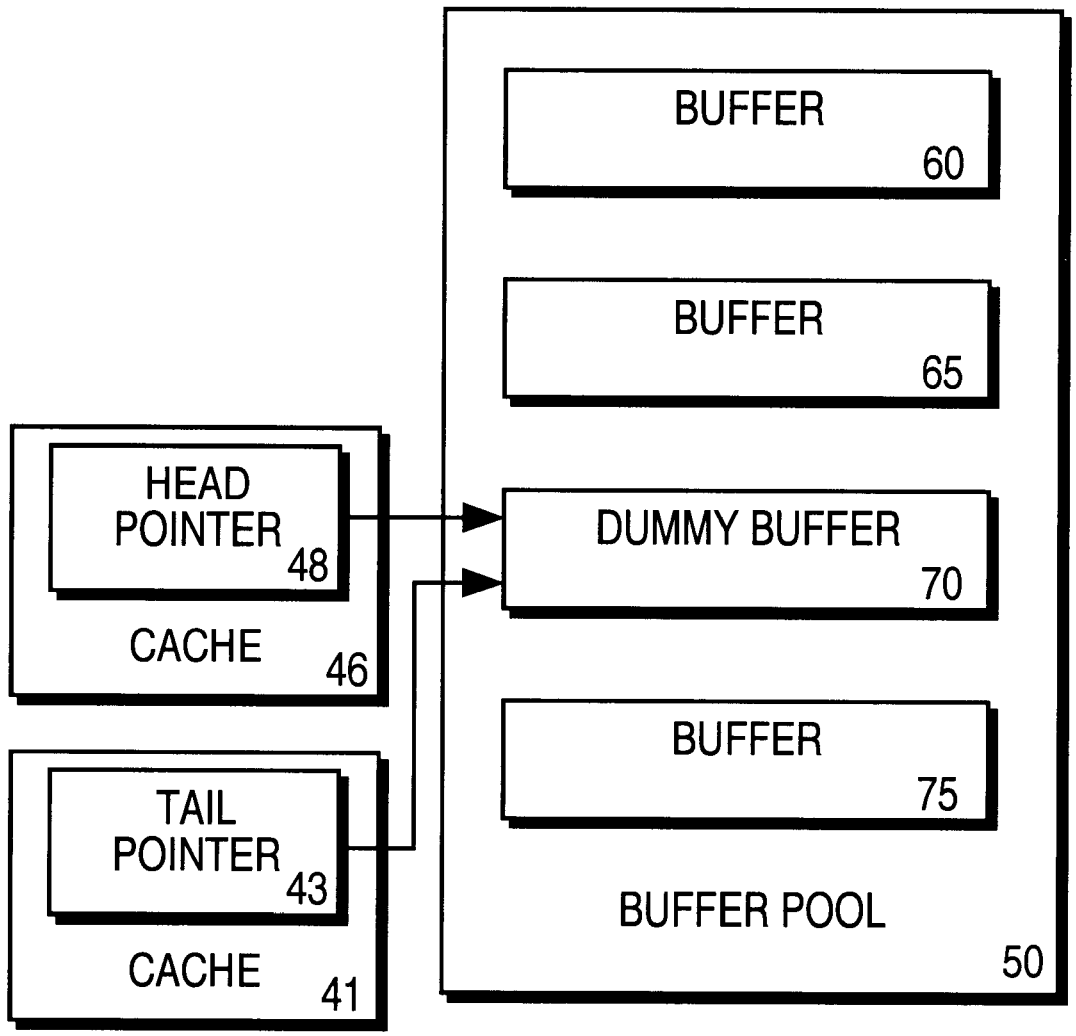

FIG. 9D shows the head pointer as pointing to buffer 65, indicating that the servicing processor was enabled to remove a data element from the data queue, determined that the next pointer 62 pointed to a buffer, and reset the head pointer to indicate buffer 65 and to recycle buffer 60. The servicing processor reads the data element stored by buffer 65 and maintains the head pointer as pointing at buffer 65 such that buffer 65 becomes a dummy buffer as shown in FIG. 9E. In FIG. 9F, buffer 65 is recycled, and the head and tail pointers both indicate buffer 70. After the data element is read from buffer 70, buffer 70 becomes a dummy buffer as shown in FIG. 9G. Thus, the data queue is empty. Should the servicing processor be enabled to remove another data element from the data queue, the servicing processor detects an empty queue by reading the next pointer of dummy buffer 70.

Figure 10:
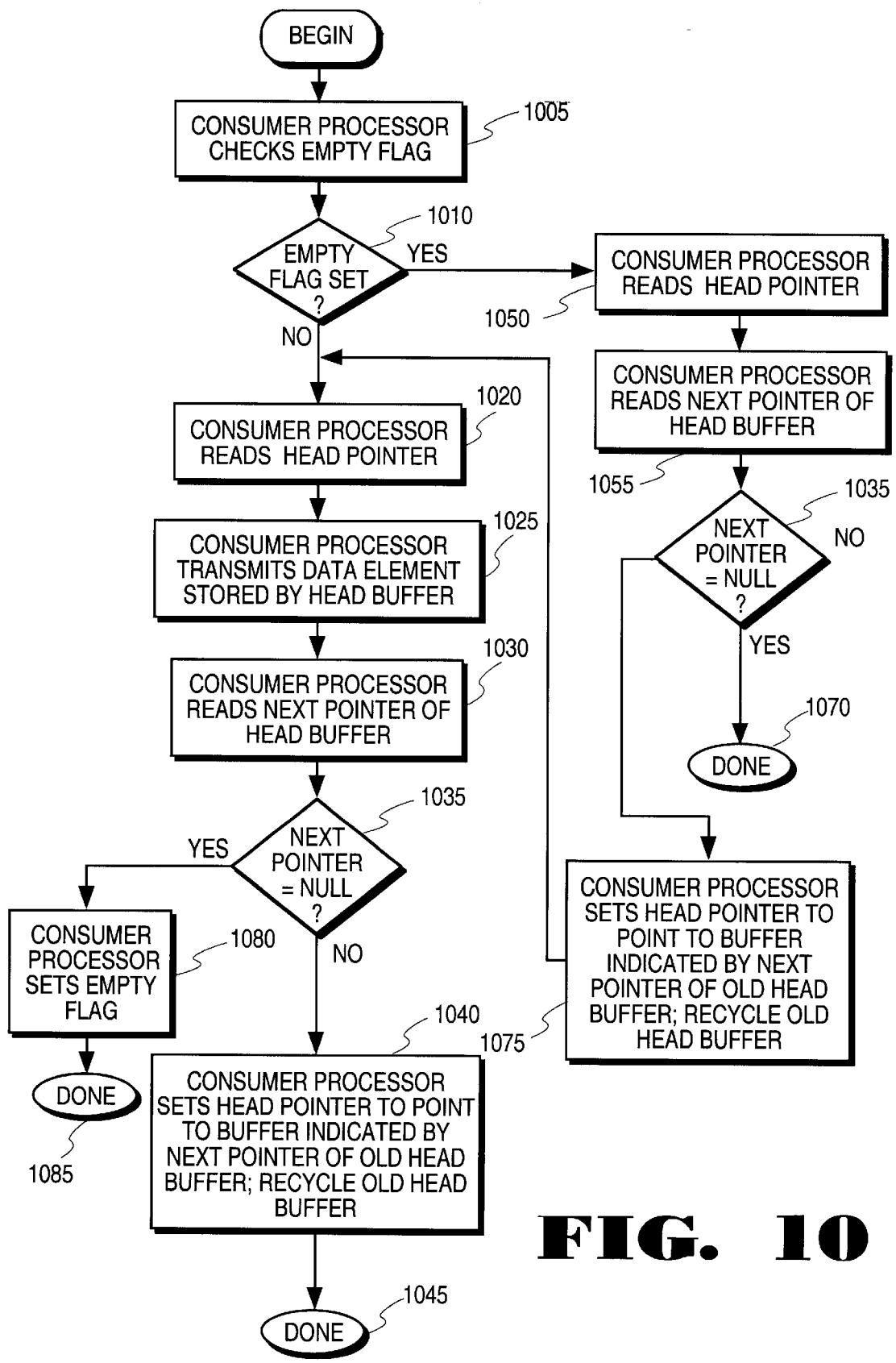
FIG. 10 shows a buffer management method according to one embodiment.

FIG. 10 shows a more detailed "read-then-recycle" queue management method such as that shown in FIG. 7. The process begins at process block 1005 when the servicing processor is enabled to remove a data element from the data queue stored by the buffer queue. At process block 1010, the servicing processor checks an empty flag to determine if the stored data queue is empty. If the servicing processor determines at process block 1015 that the data queue is empty, servicing processor performs the steps shown in process blocks 1050–1075, as described below.

Assuming that the data queue is not empty, the servicing processor reads the head pointer at process block 1020. At process block 1025, the servicing processor transmits the data element stored by the head buffer. At process block 1030, the servicing processor reads the next pointer of the head buffer. If the servicing processor determines at process block 1035 that the next pointer does not point to another buffer, the data queue is empty, and the servicing processor sets the empty flag at process block 1080, and the process ends at process block 1085. At process block 1040, if the data queue is not empty, the servicing processor sets the head pointer to point to the buffer indicated by the next pointer of the head buffer. There is therefore a new head buffer, and the old head buffer is recycled. The process ends at process block 1045.

If the empty flag was set at process block 1015, the servicing processor reads the head pointer at process block 1050 and the next pointer of the head buffer (which is a dummy buffer) indicated by the head pointer at process block 1055. If the servicing processor determines at process block 1060 that the next pointer of the dummy buffer is null, the data queue is empty, and the process ends at process block 1070. The next pointer of the dummy buffer is updated by the queuing processor when a data element is added to an empty data queue because the dummy buffer is also the tail buffer of the buffer queue. At process block 1075, if the queuing processor has added a data element to the previously empty data queue, the servicing processor sets the head pointer to point to the buffer indicated by the next pointer of the dummy buffer, and the dummy buffer is recycled. The process continues at process block 1020. The process steps shown by process blocks 1005–1010 and 1050–1075 are not required if a separate mechanism is provided to ensure that the servicing processor is not allowed to read from an empty data queue. For example, the service module may maintain a value indicative of the data queue length that is checked to detect an empty data queue, wherein servicing of the data queue is prevented if the data queue is empty.

Figure 11A:
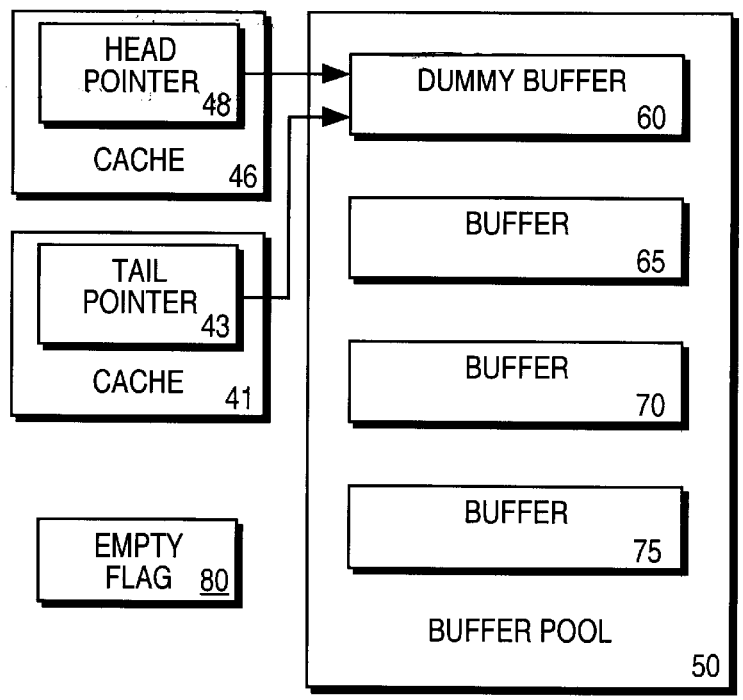
FIGS. 11A, 11B, 11C, 11D, 11E, and 11F illustrate the operation of the method shown in FIG. 10.
Figure 11B:
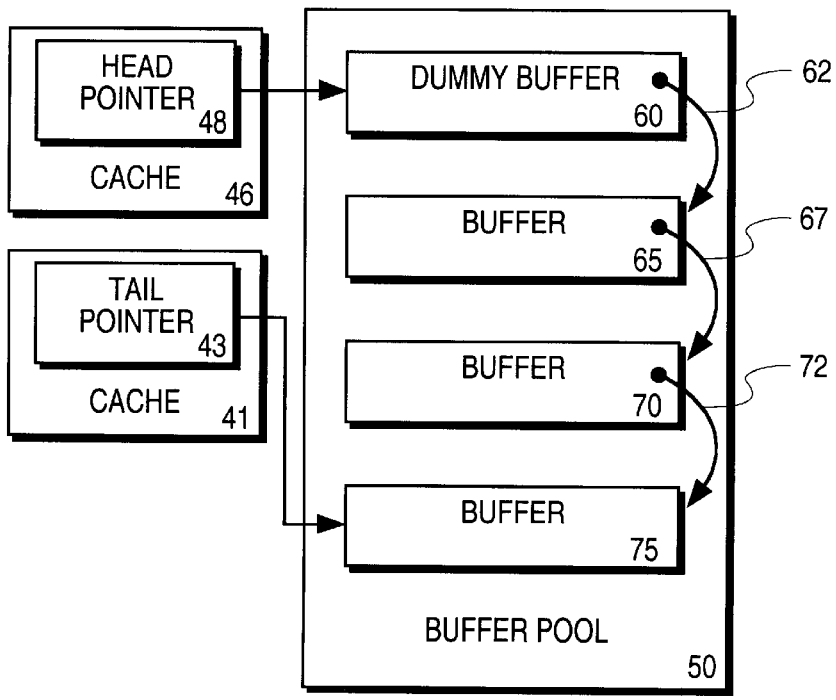

FIGS. 11A–11F illustrate the method described with respect to FIG. 10. FIG. 11A shows an empty data queue such as that shown in FIG. 9A wherein an empty flag 80 is set. As shown in FIG. 11B, the queuing processor has added three data elements to the data queue. Next pointer 62 of dummy buffer 60 points to buffer 65; next pointer 67 of buffer 65 points to buffer 70; and next pointer 72 of buffer 70 points to buffer 75, which is the last buffer of the buffer queue. The head pointer currently points to dummy buffer 60, and the tail pointer points to buffer 75.

Figure 11C:
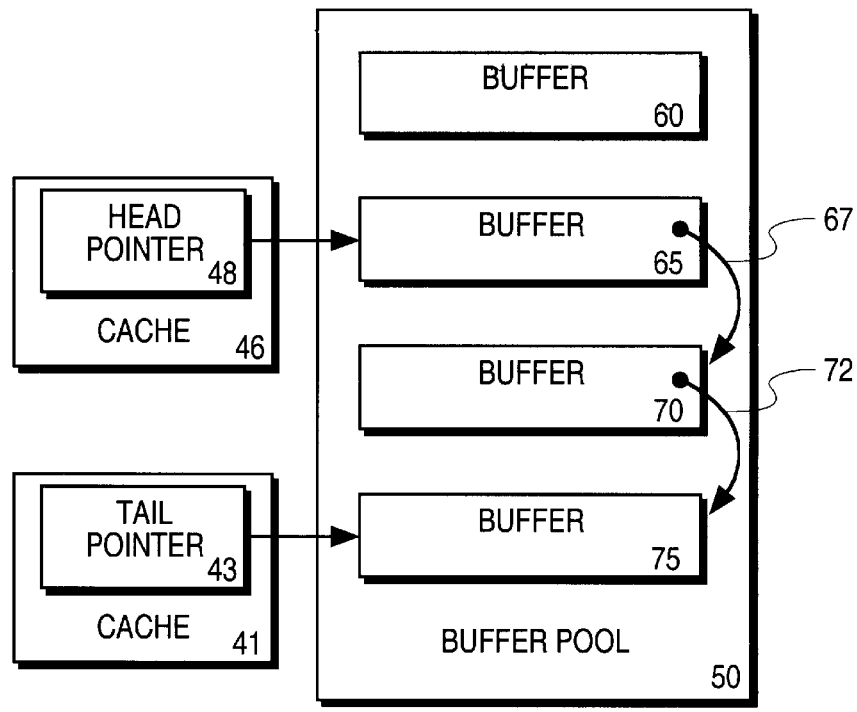
Figure 11D:
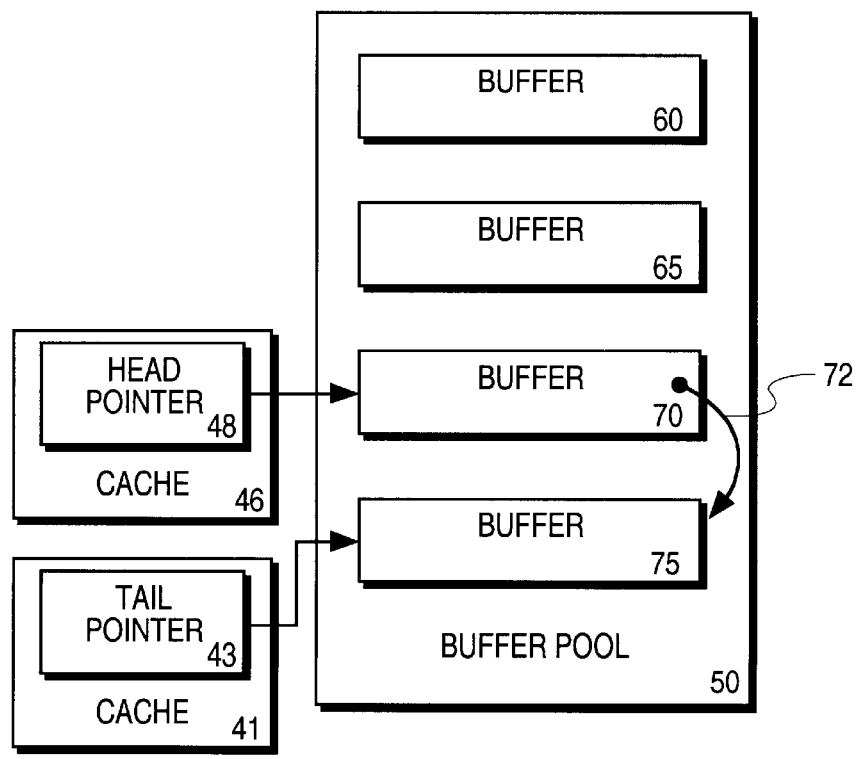

As shown in FIG. 11C, the servicing processor has been enabled to removed data elements from the data queue. Buffer 60 has been recycled, and the head pointer points to buffer 65. The empty flag has been reset. The servicing processor reads the data element of buffer 65 and then reads the next pointer of buffer 65, allowing buffer 65 to be recycled. Thus, FIG. 11D shows the head pointer as pointing to buffer 70. The servicing processor reads the data element of buffer 70 and then reads the next pointer of buffer 70, allowing buffer 70 to be recycled.

Figure 11E:
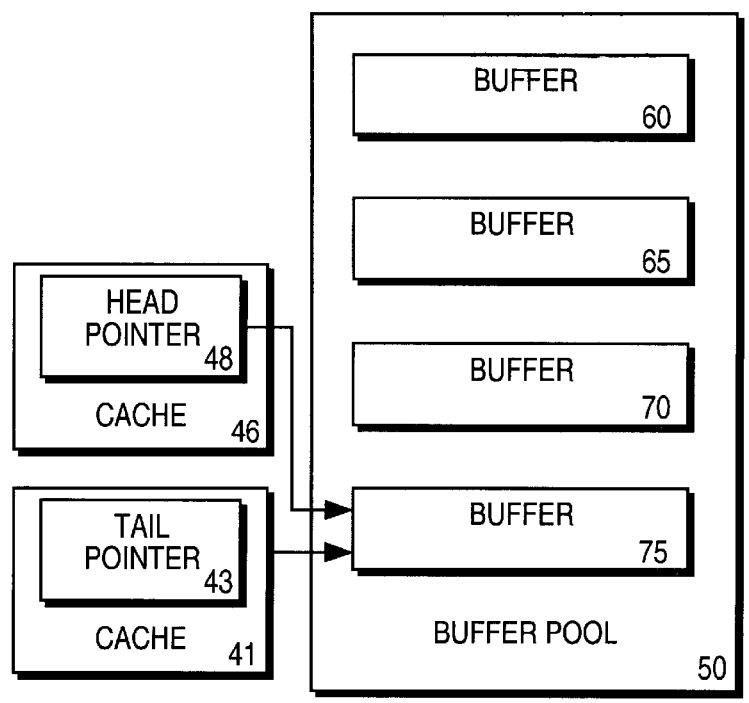
Figure 11F:
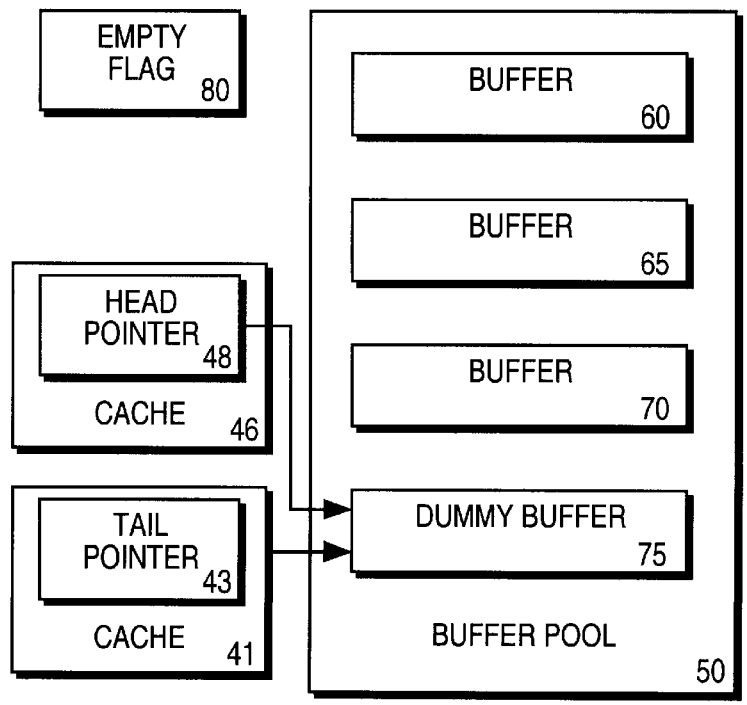

FIG. 11E shows the head pointer as pointing to buffer 75. The tail pointer also points to buffer 75, which still stores a valid data element such that the data queue is not empty. The servicing processor reads the data element of buffer 75 and then reads the next pointer of buffer 75. Upon determining that buffer 75 is the last buffer in the buffer queue, the servicing processor sets the empty flag 80 to indicate an empty data queue, as shown in FIG. 11F.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A service module, comprising:

a buffer queue that stores a data queue, the buffer queue comprising a plurality of buffers being linked to one another as a linked list using next pointers;

a first processor including a first cache coupled to the buffer queue; and a second processor including a second cache coupled to the buffer queue, wherein the first processor is configured to store a head pointer of the buffer queue in the first cache and the second processor is configured to store a tail pointer of the buffer queue in the second cache, the first cache being independent of the second cache.

2. The service module of claim 1, wherein the head pointer and the tail pointer point to a dummy buffer when the data queue is empty.

3. A circuit, comprising;

a buffer queue that stores a data queue;

a first processor coupled to the buffer pool; and a second processor coupled to the buffer pool, wherein the first processor includes a first memory location that stores a head pointer of the buffer queue and the second processor includes a second memory location that stores a tail pointer of the buffer queue, the head pointer and the tail pointer always pointing to a buffer, the first memory location being independent of the second memory location.

4. The circuit of claim 3, wherein the first memory location is a first cache controlled only by the first processor, and the second memory location is a second cache controlled only by the second processor.

5. The circuit of claim 3, wherein the first memory location is a first internal register controlled only by the first processor, and the second memory location is a second internal register controlled only by the second processor.

6. A method for managing a buffer queue that stores a data queue, wherein the data queue comprises a set of n data elements, n being at least zero, the method comprising the steps of:

storing a head pointer at a first location, the head pointer indicating a head buffer of the buffer queue;

storing a tail pointer in a second location, the tail pointer indicating a tail buffer of the buffer queue;

reading the head pointer with a first processor to determine the head buffer of the buffer queue when a data element is to be removed from the data queue, the buffer queue comprising a plurality of buffers for storing the data elements, the buffers being linked to one another as a linked list using next pointers;

reading a next pointer of the head buffer with the first processor;

using the first processor to set the head pointer to point to a new head buffer when the next pointer has a first value indicative of the new head buffer, to read a first data element of the data queue stored by the new head buffer, and to maintain the head pointer to indicate the new head buffer, otherwise determining that the data queue is empty when the next pointer has a second value which indicates that the head buffer is a dummy buffer;

adding a new data element to the data queue with a second processor by adding a new tail buffer to the buffer queue, the new tail buffer storing the new data element; and updating the tail pointer using the second processor to indicate the new tail buffer as being the tail buffer.

7. The method of claim 6, further comprising the steps of:

initially determining whether the data queue is empty; and reading using the first processor a first data element stored by the head buffer prior to the step of reading the next pointer of the head buffer.

8. The method of claim 6, wherein the next pointer is stored as part of the head buffer, the step of reading the next pointer comprising the step of reading the head buffer.

9. The method of claim 6, wherein the step of storing the head pointer in a first location comprises the step of storing the head pointer in a first cache memory controlled by the first processor.

10. The method of claim 6, wherein the first processor sets an empty flag to indicate that the data queue is empty upon determining that the data queue is empty.

11. The method of claim 6, wherein the step of storing the tail pointer in a second location comprises the step of storing the tail pointer in a second cache memory controlled by the second processor.

12. A circuit for managing a buffer queue that stores a data queue comprising a set of n data elements, the circuit comprising:

a first memory storing a head pointer indicating a head data element of the queue;

a first processor coupled to the first memory for removing data elements from the data queue, for reading the head pointer to determine a head buffer of the buffer queue when a data element is to be removed from the data queue, for reading a next pointer of the head buffer, for determining that the data queue is empty when the next pointer has a first value which indicates that the head buffer is a dummy buffer, for setting the head pointer to point to a new head buffer when the next pointer has a second value indicative of the new head buffer, for reading a first data element of the data queue stored by the new head buffer, and for maintaining the head pointer to indicate the new head buffer;

a second memory for storing a tail pointer, the tail pointer indicating a tail data element of the queue; and a second processor for adding a new data element to the queue, for updating the tail pointer to indicate a new tail buffer that stores the new data element as being the tail buffer, wherein the first processor updates the head pointer to indicate the new data element as being the head data element in response to detecting that the next pointer has the second value, wherein the buffer queue comprises a plurality of buffers for storing the data elements, the buffers being linked to one another as a linked list using next pointers.

13. The circuit of claim 12, wherein the first memory is a first cache controlled by the first processor.

14. The circuit of claim 13, wherein the second memory is a second cache controlled by the second processor.

15. A circuit for managing a buffer queue for storing a data queue comprising a set of n data elements, wherein n is at least zero, the circuit comprising:

a buffer pool including a plurality of buffers being linked to one another as a linked list using next pointers;

a first processor coupled to the buffer pool;

a first memory location coupled to and accessed only by the first processor, the first memory location storing a head pointer indicative of a head buffer of the buffer queue, wherein the head pointer always points to a buffer;

a second processor coupled to the buffer pool;

a second memory location coupled to and accessed only by the second processor, the second memory location storing a tail pointer indicative of a tail buffer of the buffer queue, wherein the second processor adds buffers of the buffer pool to the buffer queue and the first processor removes buffers from the buffer queue and returns them to the buffer pool.

16. The circuit of claim 15 wherein the tail pointer always points to a buffer.

17. The circuit of claim 15, wherein the first memory location is a first cache memory internal to the first processor and the second memory location is a second cache memory internal to the second processor.

18. The circuit of claim 15, wherein the first memory location is a first register internal to the first processor and the second memory location is a second register internal to the second processor.

19. A service module comprising:

buffering means for storing a data queue, the buffering means comprising a plurality of buffers being linked to one another as a linked list using next pointers;

first processor means including a first cache coupled to the buffering means; and second processor means including a second cache coupled to the buffering means, wherein the first processor means is configured to store a head pointer of the buffering means in the first cache and the second processor means is configured to store a tail pointer of the buffering means in the second cache, the first cache being independent of the second cache.

20. The service module of claim 19, wherein the head pointer and the tall pointer point to a dummy buffer when the data queue is empty.

21. A circuit, comprising:

buffering means for storing a data queue;

first processor means coupled to the buffering means; and second processor means coupled to the buffering means, wherein the first processor means includes a first memory means that stores a head pointer of the buffering means and the second processor means includes a second memory means that stores a tail pointer of the buffering means, the head pointer and the tail pointer always pointing to a buffer, the first memory means being independent of the second memory means.

* * * * *